United States Patent [19]

Hawley et al.

[11] 4,427,105

[45] Jan. 24, 1984

[54] AUGER CASING LATCHING MECHANISM

[75] Inventors: Laird V. Hawley; Eugene T. Logan, both of Claremore, Okla.

[73] Assignee: Parham Industries, Inc., Claremore, Okla.

[21] Appl. No.: 303,420

[22] Filed: Sep. 18, 1981

[51] Int. Cl.³ ............................................. B65A 33/32
[52] U.S. Cl. .................................... 198/632; 198/666; 414/523
[58] Field of Search ............... 198/313, 581, 632, 666, 198/668; 414/523, 526; 285/283; 403/85, 102, 322; 194/2 A, 9, 17

[56] References Cited

U.S. PATENT DOCUMENTS

| 688,912 | 12/1901 | Watts | 198/313 X |
| 785,241 | 3/1905 | Ulrich | 198/632 |
| 3,417,882 | 12/1968 | McConnell | 198/632 X |
| 4,336,877 | 6/1982 | Gill | 198/632 |

Primary Examiner—Joseph E. Valenza
Assistant Examiner—D. Williamson
Attorney, Agent, or Firm—Head, Johnson & Stevenson

[57] ABSTRACT

A latching mechanism for a grain handling auger casing having at least two separable casing sections hingedly secured together to provide alternate axially aligned positions therebetween for delivery of grain therethrough and mis-aligned positions therebetween for storage of the auger casing during periods of non-use, the latching mechanism including pivotal arms secured to one of the casing sections and movable by the reciprocal piston rod of a hydraulic cylinder secured to the other of the casing sections whereby the two casing sections may be selectively moved into the aligned extended position or mis-aligned position, a spring urged rod member pivotally secured to the arms and extending slidably into a tube member, a latching linkage assembly secured to one casing section and operable by the tube and rod member upon actuation by the pivotal arms, and an adjustable eccentric secured to the other casing section and engageable by the latching linkage assembly in the aligned position between the casing sections for securing the casing sections in the extended position.

8 Claims, 8 Drawing Figures

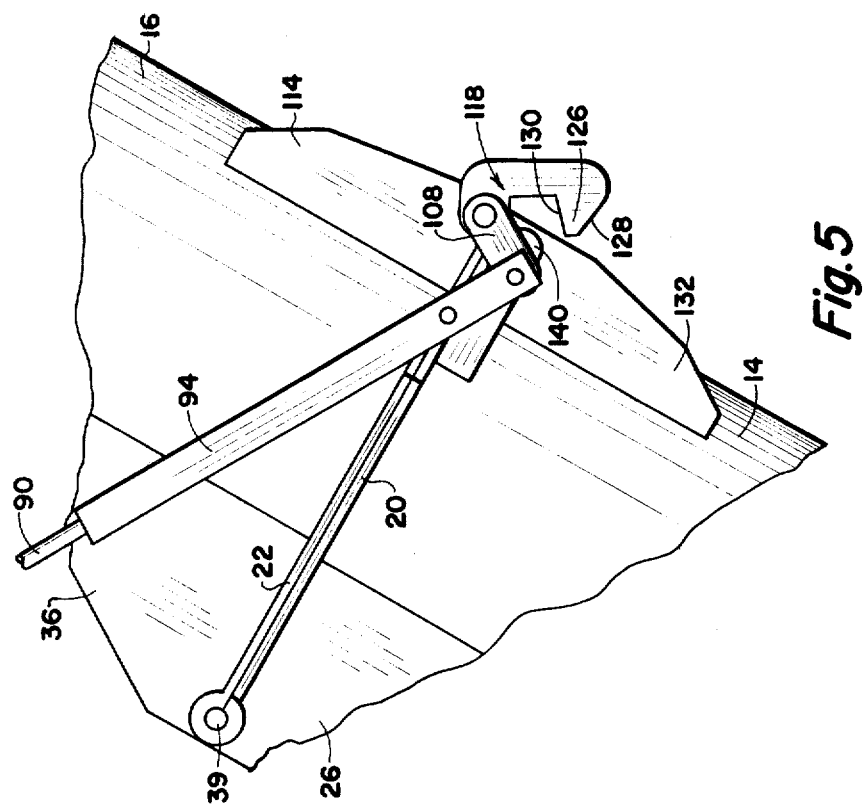
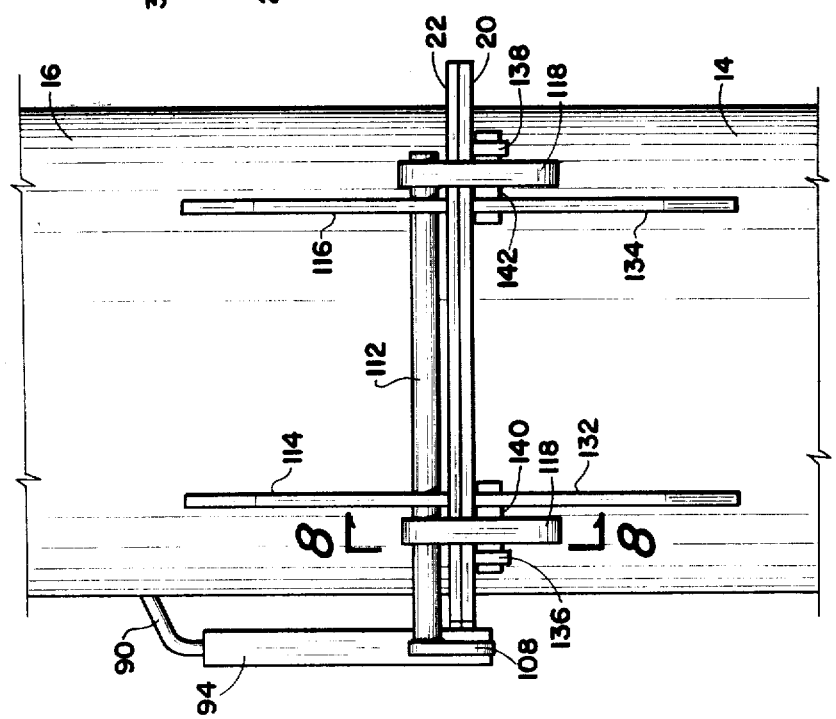

AUGER CASING LATCHING MECHANISM

BACKGROUND OF THE INVENTION

1. Field of the Invention

This invention relates to improvements in grain handling devices and more particularly, but not by way of limitation, to an auger casing for conveying materials such as utilized in combination with a grain cart in the harvesting of grains.

2. Description of the Prior Art

In the harvesting of grain it is the present day practice to utilize grain carts which are towed across or along a field by a suitable vehicle and which move in side-by-side relation to the usual thresher for receiving the grain therefrom. The grain cart usually has a capacity several times as great as the thresher and when the cart is filled with grain, the cart is usually towed or moved to a storage site where the grain is removed from the cart by an auger means for discharge through the usual auger casing. The grain chute normally remains in an upright position during transporting of the cart across the field, and the chute "wiggle-waggles" a considerable amount as the cart moves over the rough terrain of the field. As a consequence it is desirable to fold the auger casing or "break" the casing at some point along the length thereof for folding into a position against the cart when the casing is not in use for discharging grain therethrough. There are many presently available devices for folding and unfolding casings of this kind, and they generally comprise a hydraulic cylinder operably secured between the two parts of the chute whereby contraction of the piston rod into the cylinder folds the outer chute section downwardly into a position substantially adjacent the inner or lower casing section, and extension of the rod from the cylinder extends the casing for a substantially axially aligned position between the two chute sections. One particular disadvantage of these sectional or foldable casings resides in the fact that the joint therebetween bounces, or alternately opens and shuts, causing undue wear at the joint for decreasing the useful life of the casing. Locking means have been devised for solving this problem, such as those shown in the Maxon, Jr. U.S. Pat. No. 2,880,997, issued Apr. 7, 1959, and entitled "Dump Truck for Concrete and Other Semi-Liquid Material"; the Davidow U.S. Pat. No. 3,550,793, issued Dec. 29, 1970, and entitled "Mounting Mechanism for Augar"; the Howell et al U.S. Pat. No. 3,721,359, issued Mar. 20, 1973, and entitled "Unloader Tube Latching Mechanism"; the Carlson U.S. Pat. No. 2,770,101, issued Nov. 6, 1973, and entitled "Unloading Boom for Material Handling Vehicle"; and the Schrag et al U.S. Pat. No. 4,044,906, issued Aug. 30, 1977, and entitled "Multiple Round Bale Mover". Whereas these prior patents show latching means for holding the two sections of a conveyor chute or casing apparatus together, they are somewhat cumbersome and expensive, and in addition, they do not solve still another problem in that the conveyors normally utilized with the grain carts contain a centrally disposed auger extending longitudinally therethrough. Of course, the auger mechanism must also be provided with a joint along the length thereof, and when the two casing sections are moved to the extended position or longitudinally aligned position therebetween the two auger sections may not be in a driving alignment, and this may preclude a complete closing of the joint between the two casing sections.

SUMMARY OF THE INVENTION

The present invention contemplates a novel grain handling auger casing control means which has been particularly designed and constructed for overcoming the foregoing disadvantages. The novel device comprises hydraulic cylinder means having the outer end of the cylinder pivotally secured to the first section of the auger casing and the outer end of the reciprocal piston rod pivotally secured to a pivot arm means which in turn is pivotally secured to the second casing section. The pivot arm means comprises a pair of spaced plates having an apertured cross member means secured therebetween. A stud member extends through the aperture in the cross member, and a pair of heavy helical spring members are disposed around the outer periphery of the stud on opposite sides of the cross member. In addition, a rod member is secured inboard of the pivot arms for limiting the pivotal movement thereof in a direction toward the casing. A push rod has one end pivotally secured to the pivot arms and piston rod at the pivot connection therebetween, and the opposite end of the push rod extends slidably into a square tubing which is pivotally secured at the outer end thereof to a peripheral flange provided on the second casing section, or in the proximity of the flange. A helical spring means is provided within the square tubing and has one end anchored against the closed upper end of the square tubing and the opposite end anchored at a stop means which is adjustably secured to the end of the push rod. A bell crank assembly is pivotally secured to the outer end of the square tubing and includes a hook or latch means removably engagable with eccentric means which is secured to a peripheral flange provided at the upper end of the first chute section.

When the two chute sections are disposed in axial alignment, the spring urged latch means is in engagement with the eccentric means for securely holding the peripheral flanges in abuttment and in a manner substantially precluding accidental disengagement therebetween. The latch means is particularly configured whereby the outer ends thereof cooperate with the eccentric means to permit an adjustment between the abutting ends of the chute sections to assure an efficient engagement therebetween. When the second chute section is to be folded into a "down" position, substantially adjacent the first chute section, the reciprocal rod is contracted or withdrawn into the cylinder, thus pivoting the pivot arm in a direction for moving the push rod toward the latch means, whereupon the bell crank assembly actuates to release the engagement of the latch means with the eccentric means. A continued contraction of the push rod pulls the second chute section to the desired folded position therefor. When the second chute section is to be returned to the extended position therefor, the reciprocal rod is extended with respect to the cylinder, whereupon the peripheral flanges are moved into an abutting relationship. At this point, a continued extension of the reciprocal rod again pushes the push rod in a direction for actuation of the bell crank assembly to move the latch means into engagement with the eccentric means. Under normal operational conditions, the latch means automatically pivots to a position for readily receiving the eccentric means therein. However, to avoid any accidental misengagement between the latch means and the eccentric means, the outer ends of the latch means have been particularly configured to circumvent any accidental retarded free movement of the latch means, such as a binding of the pivot connection thereof, to assure that the latch means will not become lodged but will move over the upper periphery of the eccentric means and into the latching position.

In the event the two auger sections disposed within the two casing sections are in such a relative alignment when the two casing sections are moved to the extended position therebetween that the two auger sections cannot move into an abutting relation because of interference between the two drive means thereof, the novel control means is particularly arranged to preclude damage to either auger section by permitting the interference condition to be corrected by providing an automatic temporary interruption in the latching procedure.

BRIEF DESCRIPTION OF THE DRAWINGS

FIG. 4 is a view taken on line 4—4 of FIG. 3.

FIG. 5 is an elevational view of a portion of the latching means utilized in the control mechanism embodying the invention, with the latch being shown in a released position therefor.

FIG. 6 is a view similar to FIG. 3 showing the joint in an open position.

FIG. 7 is a view taken on line 7—7 of FIG. 6.

FIG. 8 is a view taken on line 8—8 of FIG. 4.

DETAILED DESCRIPTION OF THE PREFERRED EMBODIMENT

Figure 1:
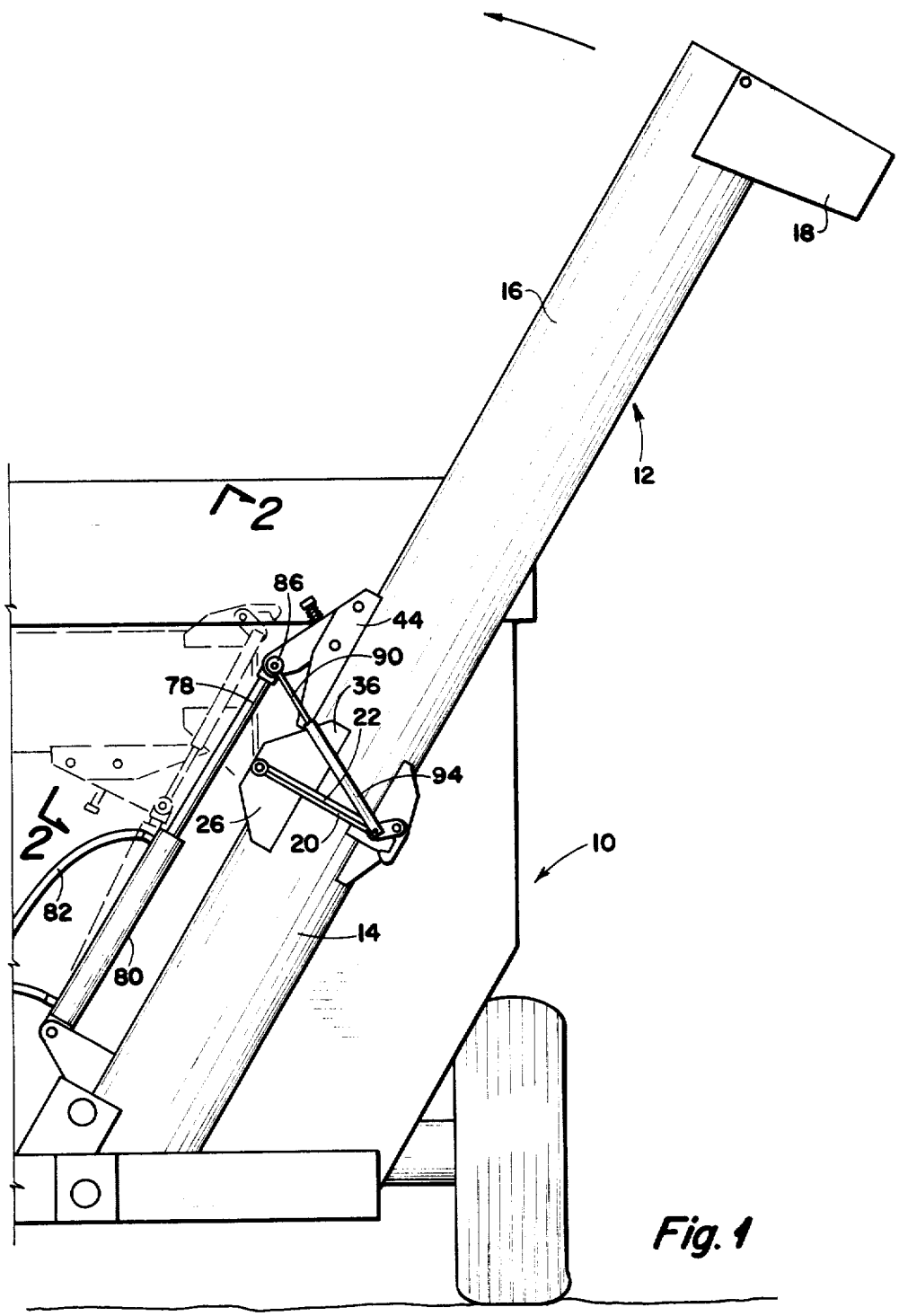
FIG. 1 is an elevational view of a grain cart having a grain handling auger casing provided with a control mechanism embodying the invention installed thereon, with the auger casing being shown in an extended position, and one position of the control means shown in solid lines and another position thereof shown in broken lines.

Referring to the drawings in detail, reference character 10 generally indicates a wheeled grain cart adapted to be towed by a suitable vehicle (not shown) for receiving a supply of grain, or the like, from harvesting equipment (not shown) as is well known. A grain handling auger casing apparatus 12 is mounted on the grain cart 10 in the usual manner and is in open communication with the interior of the cart for receiving the grain therefrom in order to deliver the grain from the cart to a suitable place of storage (not shown). The auger casing 12 may be of any suitable well known type, and as shown herein comprises a first pipe or tube member 14 open to the interior of the cart 10 and preferably secured to the forward portion of the cart, but it will be apparent that the mounting position for the tube member 14 may be at either the front or rear, or at the side of the cart, as desired. A second pipe or tube member 16 is hingedly secured to the outer end of the tube 14 in any suitable or well known manner, and is pivotal between an axially aligned position with respect to the tube 14 as shown in FIG. 1 and folded position with respect thereto, as particularly shown in FIG. 6. It is to be noted that the open position between the pipe sections 14 and 16 as shown in FIG. 6 is not intended to indicate the limit of the separation between the two sections in the storage position of the casing, as will be hereinafter set forth. A suitable sectional grain auger (not shown) is journalled within the casing 12, with one section of the auger being disposed within the pipe 14 and another section of the auger disposed within the pipe 16. The auger sections extend longitudinally within the respective pipe sections and are provided with suitable coupling means for establishing a driving engagement between the two sections for discharge of materials from the cart 10, as will be hereinafter set forth in detail. In addition, a suitable discharge chute means is suitably secured to the outer end of the pipe 16 and in open communication therewith for receiving the materials therefrom during a discharge operation, as is well known.

A first peripheral flange means 20 is secured at the outer end of the first pipe section 14 extending outwardly from the circumference thereof and is preferably of a substantially square or rectangular configuration around the outer periphery thereof. A second generally similar peripheral flange means 22 is suitably secured around the outer periphery of the inner end of the pipe section 16 and is adapted for an abutting engagement with the flange 20 in the longitudinally aligned position between the pipe sections 14 and 16. A pair of spaced support plates or flanges 24 and 26 are welded or otherwise rigidly secured between the outer periphery of the pipe section 14 and the flange 20 and are preferably spaced apart by an arcuate ring means 28 disposed adjacent the outer periphery of the pipe 14. Longitudinally aligned journal members 30 and 32 are provided at the upper end of the flanges 24 and 26, respectively and extend inwardly therefrom as particularly shown in FIG. 2. A second pair of support plates or flanges 34 and 36 are welded or otherwise rigidly secured between the outer periphery of the pipe 15 and the flange 22. Suitable longitudinally aligned journal members 38 and 40 are provided at the lower end of the flanges 34 and 36, respectively, and extend outwardly therefrom. The journals 38 and 40 are positioned outboard of the journals 30 and 32, respectively, and a shaft member 39 extends between and through the journals and is supported for relative rotational movement therebetween to provide a hinge means at the joint between the two pipe sections 14 and 16. Of course, suitable stop means 41 may be provided at one end and second stop means 43 provided on the shaft 39 for precluding accidental withdrawal of the shaft from the journals.

A pair of substantially mutually parallel spaced plates 42 and 44 are rigidly secured to the outer periphery of the pipe section 16 and are spaced inboard of the flanges 34 and 36 and slightly longitudinally upwardly therefrom as viewed in the drawings. A second pair of substantially mutually parallel spaced plate members or arms 46 and 48 are disposed between the plates 42 and 44, as particularly seen in FIG. 2, and are pivotally secured at the upper ends thereof to a pivot shaft 50 which extends transversely between the plates 42 and 44. It will be apparent that the arms 46 and 48 may pivot about the longitudinal axis of the shaft 50 and the shaft 50 may be held stationary, or the shaft 50 may be rotatable about its own longitudinal axis and the arms 46 and 48 rigidly secure thereto for movement simultaneously therewith, as desired.

A second transversely extending shaft 52 is secured between the arms 42 and 44 in spaced relation with respect to the pivot shaft 50, and a sleeve member 54 (FIG. 7) is disposed around the outer periphery of the shaft 52 and interposed between the plates 42 and 44. The outer periphery of the sleeve 52 engages the arms 46 and 48 for limiting the movement thereon in the direction toward the pipe section 16. In addition, a plate member 56 is rigidly secured between the arms 46 and 48 outboard of the sleeve 54 and is provided with aperture means 58 for loosely receiving a bolt member 60 therethrough. The bolt head 62 is secured at one end of the post 60 and is welded or otherwise secured to the outer periphery of the sleeve 54 for retaining the post in position. The outer end of the post 60 is preferably threaded as shown at 64 for receiving the adjustable stop member 66 and lock nut 68 thereon. A first helical spring means 70 is disposed around the outer periphery of the post 60 and has one end suitably anchored at the bolt head 62 and the opposite end anchored against plate member 56. A second suitable helical spring 72 is disposed around the outer periphery of the post 60 outboard of the plate 56 and has one end suitably anchored against the plate 56 and the opposite end anchored at the stop means 66. In this manner a predetermined force may be applied to the arms 46 and 48 through the plate member 56 for control of the pivotal action of the arms for a purpose as will be hereinafter set forth.

A transversely extending headed pin 74 is secured between the arms 46 and 40 in the proximity of the outer ends thereof and provides a pivot shaft for receiving one end 76 of a reciprocal rod means 78 is reciprocal with respect to a suitable hydraulic cylinder 80, or the like, which is operably connected with a suitable source of fluid (not shown) through suitable conduit means 82 (FIG. 1) whereby fluid may be alternately directed to and withdrawn from the opposite ends of the piston member (not shown) of the rod means 78 for reciprocation of the rod as is well known. When the rod means 78 is extended with respect to the cylinder 80, the pipe sections 14 and 16 are pivoted about the hinge pin 39 in one direction and when the rod 78 is withdrawn with respect to the cylinder 80, the pipe sections 14 and 16 are rotated about the hinge pin 39 in an opposite direction as will be hereinafter set forth.

Figure 2:
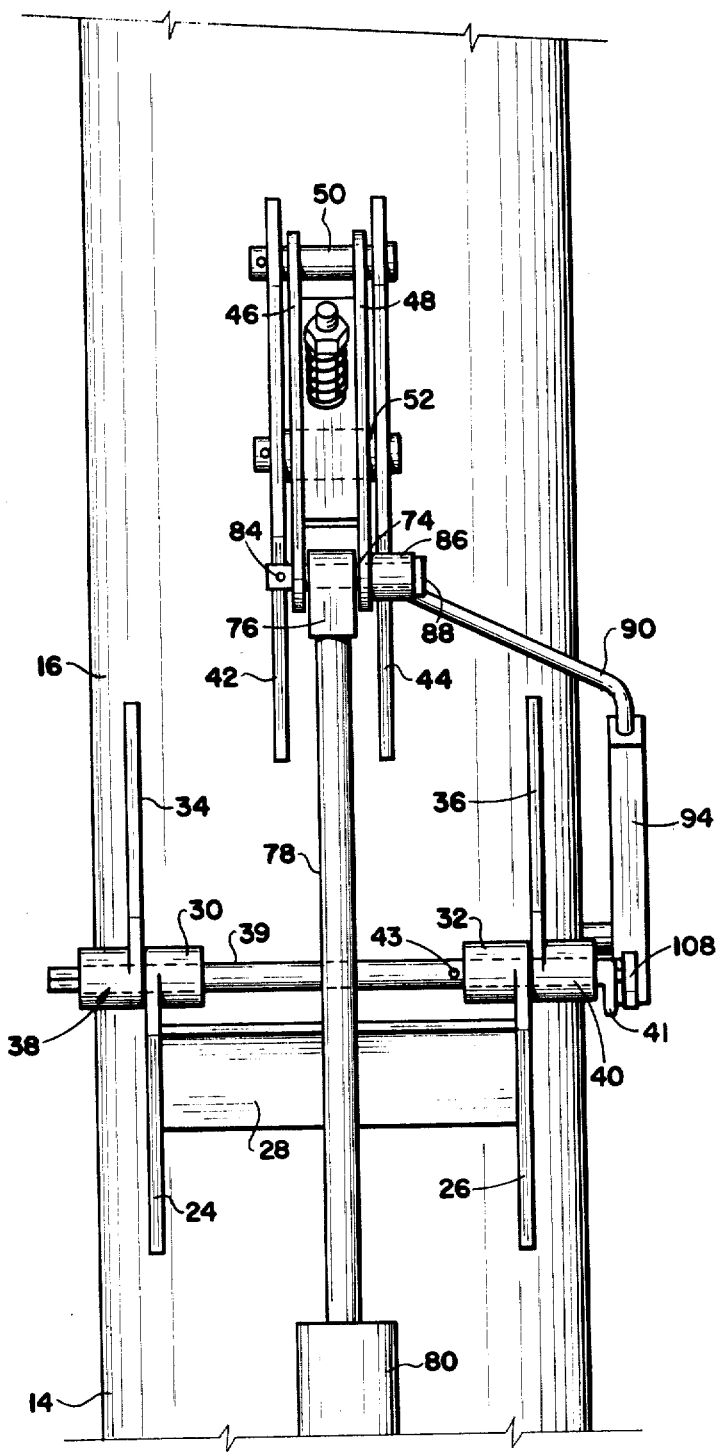
FIG. 2 is a view taken on line 2—2 of FIG. 1.

The headed pin 74 is secured in position in any suitable manner, such as by a cotter pin 84 extending transversely therethrough in the proximity of one end thereof and disposed outboard of one of the arms, such as the arm 46, as shown in FIG. 2. The opposite end of the pin 74 extends beyond the outer face of the other arm, such as the arms 48, for receiving a collar or journal member 86 thereon. The journal 86 may be retained in position on the end of the headed pin 74 in any suitable manner, such as by the head member 88 of the pin 74. An angular rod member 90 has one end secured to the outer periphery of the journal 86 and extends radially outwardly therefrom. The outer end of the rod 90 extends slidably through an aperture 92 provided in a closed end 93 of a square tubing member 94. The outer end of the rod 90 is preferably threaded as shown at 96 in FIG. 6 for receiving an adjustable stop member 98 thereon said stop 98 being disposed within the tube 94 in spaced relation with respect to the closed end 93. A suitable helical spring 100 is disposed around the outer periphery of the rod 90 and has one end anchored at the closed end 93 and the opposite end anchored at the stop member 98. A spacer sleeve 102 is interposed between the tubing 94 and disposed around the threaded end 96 of the rod 90 and in one relative position between the rod 90 and tube 94 one end of the sleeve 102 bears against the stop member 98 and the opposite end thereof bears against a pin 104 which extends transversely through the tube 94 outboard of the threaded end 96. As the rod 90 is moved in one direction within the tube 94, the outer end of the sleeve 102 bearing against the outer periphery of the pin 104 causes the tube 94 to move longitudinally in one direction. When the rod 90 is moved in an opposite direction within the tube 94, the helical spring means 100 is compressed between the stop member 98 and the closed end 93 and ultimately moves the tube 94 in a corresponding longitudinal direction.

The outer end of the tube 94 is preferably biforcated or slotted as shown at 106 in FIG. 6 for receiving one end of a link member 108 therein. The link 108 is pivotally secured to the tubing by a suitable pivot pin 110. The link member 108 is rigidly secured to one end of a shaft 112 which extend through and beyond a pair of spaced, mutually parallel flanges 114 and 116 secured to the outer periphery of the pipe section 16. The shaft 112 may be journalled in the flanges 114 and 116 in any suitable manner for rotation about its own longitudinal axis. A pair of substantially identical latch members 118 are secured to the shaft 112, with one of the latch members preferably being disposed outboard of the flange 114 and the other latch member being disposed outboard of the flange 116, as clearly shown in FIG. 4. The latch members 118 may be securd to the shaft 112 in any suitable manner for rotation simultaneously therewith, such as by locking pins 120 (only one of which is shown in FIG. 8). Each latch is of a substantially U-shaped configuration with one arm 122 of the latch being pivotally engaged with the pivot pin 112 and the central portion 124 thereof being substantially perpendicular with respect to the arm 122. The other arm 126 of the latch 118 is substantially hook-shaped and is provided with an outer edge 128 disposed at an angle A with respect to the longitudinal axis of the central portion 124. In addition, the inner edge 130 of the hook 126 is at an angle B with respect to the perpendicular from the longitudinal axis of the central portion 124. The angle A is greater than 90° and the angle B is preferably approximately 10° for a purpose as will be hereinafter set forth.

A pair of spaced mutually parallel flanges 132 and 134 are secured to the outer periphery of the pipe section 14 in any suitable manner and as shown in FIG. 4 are preferably in substantial longitudinal alignment with the plate or flanges 114 and 116, respectively. A pair of bar or strap members 136 and 138 are secured to the outer periphery of the pipe section 14 and are spaced outboard of the flanges 132 and 134, respectively for cooperating therewith to support eccentrically arranged spools 140 and 142 therebetween. Each latch 118 is adapted to engage the respective eccentric sleeve 140 and 142 in the locked or latched position between the pipe sections 14 and 16, as will be hereinafter set forth.

When materials, such as grain, are to be discharged from the cart 10, the auger casing assembly 12 is normally in an extended position whereby the pipe sections 14 and 16 are disposed in substantial axial alignment, as shown in FIG. 1. In this position for the auger casing 12, the pipe section 14 is open to the interior of the cart whereby the grain may be deposited on the auger (not shown) extending longitudinally in the chute assembly. The auger is actuated in the usual manner for moving the grain through the chute assembly 12 and discharging the grain into the auger casing member 18 for discharge into a storage area (not shown). When the pipe sections 14 and 16 are in this extended position, the rod means 78 is in an extended position with respect to the cylinder 80, and the rod member 90 is in the outwardly telescopic position with respect to the tube 94 and the compressed spring 100 acting against the closed end 93 of the tube 94 holds the tube 94 in a position for actuation of the link member 108 in a manner for positively holding the latch members 118 in a latched position with respect to the respective eccentrics 140 and 142. The particular angular orientation of the edge 130 of the latches 118 against the outer periphery of the eccentric creates a wedging engagement between the eccentrics and the latches and spring loading of the latches in combination with the wedging action substantially precludes any accidental release of the latches from the engagement with the eccentrics. The 10° taper of the hook creates a self-tightening effect and allows an easier release of the latches when desired.

When the discharge of grain has been completed or when it is otherwise desired to separate the pipe sections 14 and 16 by opening of the joint therebetween, the rod 78 may be contracted or withdrawn with respect to the cylinder 80. This action moves the arms 46 and 48 in a manner for inserting the rod member 90 to a greater depth within the tube 94 whereby the sleeve 102 engages the pin 104 for actuation of the link member 108 in a manner for pivoting the latch members 118 into a position of disengagement with respect to the respective eccentrics 140 and 142. A continued contracting movement of the rod 78 produces a force compressing the spring 70 whereby arms 96 and 48 engage sleeve 54 whereupon the pipe section 16 will be moved about the hinge shaft 39 for separating the pipe sections 14 and 16 for the stowage position thereof.

Figure 3:
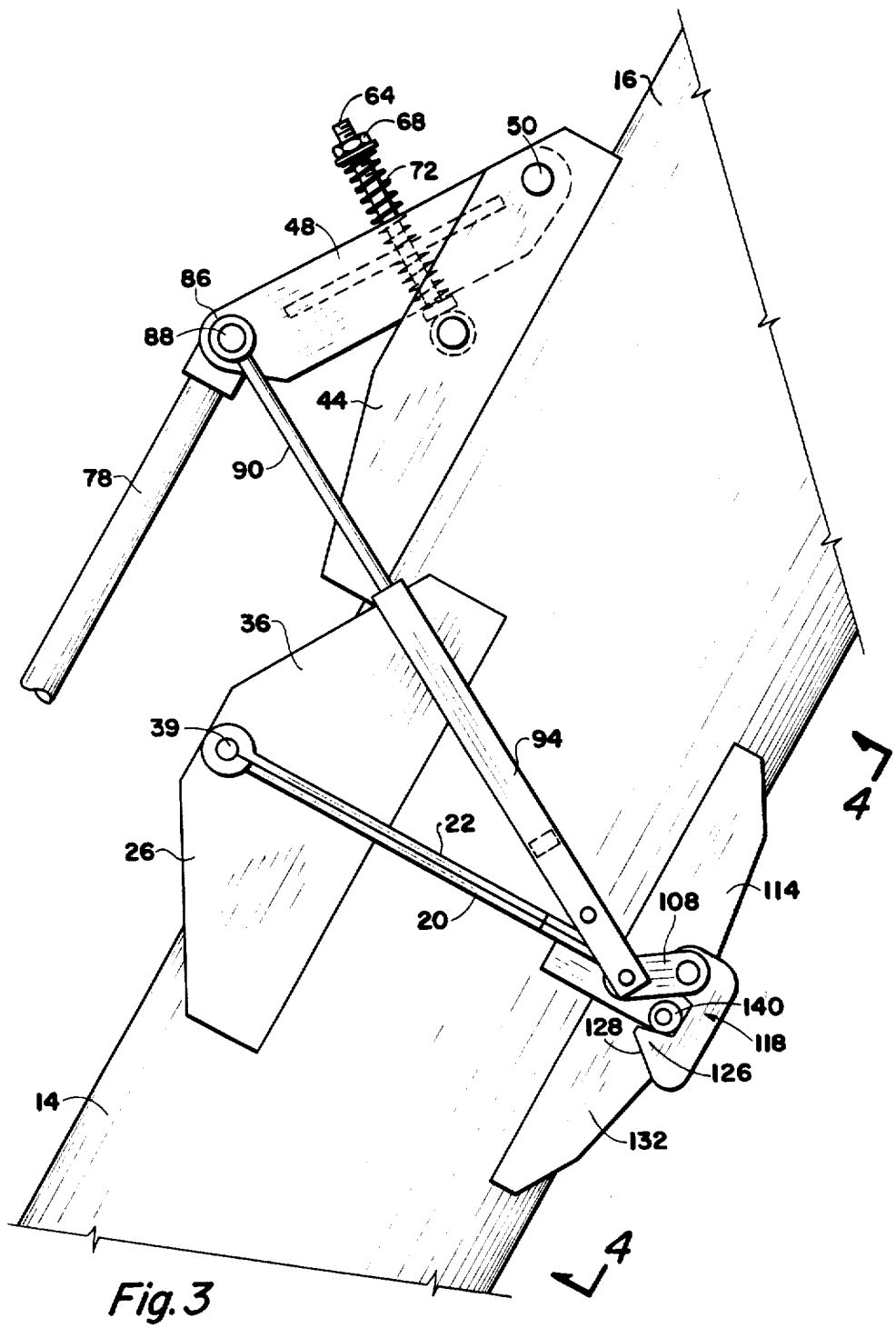
FIG. 3 is an enlarged elevational view of the joint between a pair of auger casing sections provided with a control mechanism of the invention installed thereon, with the joint shown in a closed position.

In order to re-establish the aligned position between the pipe sections 14 and 16, the rod 78 may be extended with respect to the cylinder 80, and the force of the springs 72 and 70 cooperate for causing the pipe section 16 to move into an abutting position with the pipe section 14. In the event the driving members such as drive dogs or the like, (not shown) between the two auger sections strike one on top of the other thus preventing the auger from moving into an abutting relation, protection of the entire system is provided. The hydraulic cylinder may be fully extended, extension of which raises or rotates arm 48 (FIG. 3) about pivot pin 50, compression spring 72. This overtravel of arm 48 and spring compression provides the "give" necessary to prevent overstressing of any parts of the auger which could cause damage to components of the auger such as hinges, bearings in such an interference condition. Trying to force the tube 16 into alignment with tube 14 with a rigidly attached hydraulic cylinder can be damaging. At this point the auger can be rotated, the driving members (dogs) will slide off of each other and the auger will fall on into the closed position and automatically latch. When the pipe sections 14 and 16 are in abuttment, a continued extension of the rod member 78 will overcome the force of the spring means 72 whereby the rod 90 will move axially outwardly with respect to the tube 94 to actuate the link member 108 for fully locking the latch means 118 over the respective eccentrics.

From the foregoing, it will be apparent that the present invention provides a novel latching mechanism or assembly for automatic locking of a pair of casing sections in axially aligned position and securely maintaining the chute in the extended position thereof. The latching mechanism is actuated by the extension and contraction of a hydraulic cylinder means, or the like whereby the extension of the piston rod means moves the two casing sections into an axial alignment and securely locks the sections in the aligned position, and contraction of the piston rod means automatically releases the locked position of the latching mechanism and moves the casing section into a non-aligned position for stowage of the chute during periods of non-use. In addition, the latching mechanism is particularly designed for temporarily interrupting the movement of the outer casing section in the extending direction in the event the drive members of the auger sections fall in a misaligned operational position, thus providing a safety feature to reduce accidental damage to the entire system.

Whereas the present invention has been described in particular relation to the drawings attached hereto, it should be understood that other and further modifications apart from those shown or suggested herein may be made within the spirit and scope of this invention.

What is claimed is:

1. In combination with an auger casing having at least two separable sections hingedly secured together, latching mechanism means comprising arm means pivotally secured to one of said sections, cylinder and reciprocal piston rod means operably connected between the other of said sections and the pivotal arm means, spring means carried by the pivotal arm means and cooperating with the piston rod means for pivoting of said one section with respect to the said other section to provide alternate aligned and stowage positions therebetween, second reciprocal rod means secured to the arm means for actuation thereby upon the application of sufficient pressure against the arms means for overcoming the force of the spring means, tube means reciprocally receiving the second rod means therein, latching linkage means pivotally secured between the said one section and the outer end of the tube means and actuated by the reciprocation of the second rod means with respect to the tube means, eccentric means secured to the other section in approximate alignment with the latching linkage means for alternate engagement and disengagement thereby for locking the sections in the aligned position therebetween and releasing the engagement therebetween for movement of the sections to the stowage position.

2. In combination with an auger casing having at least two separable sections hingedly secured together, latching mechanism means as set forth in claim 1 wherein the latching linkage means comprises a first link member pivotally secured between the outer end of the tube means and the said one section, a latch member having one end pivotally secured to the outer end of the link member and having hook means provided at the opposite end thereof for selective engagement with the eccentric means.

3. In combination with an auger casing having at least two separable sections hingedly secured together, latching mechanism means as set forth in claim 2 wherein the latch member is provided with an angularly arranged edge at one end of the hook means for assuring engagement between the latch member and the eccentric means under adverse pivotal operation condition of the latch member.

4. In combination with an auger casing having at least two separable sections hingedly secured together, latching mechanism means as set forth in claim 3 wherein the latch member is provided with an angularly arranged inner edge on the hook means for engagement with the eccentric means to provide wedging action in the engaged position thereof while providing for ease of release of the latch member when required.

5. In combination with an auger casing having at least two separable sections hingedly secured together, latching mechanism as set forth in claim 2 wherein the eccentric is of a configuration for cooperating with the latch member to permit adjustment between the abutting ends of the auger casing sections in the extended position thereof to assure an efficient engagement therebetween.

6. In combination with an auger casing having at least two separable sections hingedly secured together, latching mechanism means as set forth in claim 1 wherein the arm means comprises a pair of spaced mutually parallel arm members each having one end pivotally secured to the outer periphery of said one section and the inner ends thereof pivotally secured to the outer end of the reciprocal piston rod means, apertured plate means secured between the arm members, shank means extending loosely through the apertured plate means and extend beyond the opposite faces thereof; said spring means comprising first helical spring member disposed around the shank means and disposed outboard of the plate means for resisting movement thereof in one direction, and a second helical spring member disposed around the shank means and disposed inboard of the plate means for resisting movement thereof in a second direction wherein initial extension of the reciprocal piston rod means pivots one section in one direction with respect to the other section and the initial contraction of the reciprocal piston rod means pivots the said one section in an opposite direction with respect to the other section.

7. In combination with an auger casing chute having at least two separable sections hingedly secured together, latching mechanism means as set forth in claim 5 and including adjustable stop means secured to the outer end of the shank means for adjusting the force of the first mentioned helical spring member.

8. In combination with an auger casing having at least two separable sections hingedly secured together, latching mechanism means as set forth in claim 1 and including stop means disposed within the tube means and adjustably secured to the second rod means, helical spring means anchored between the stop means and one end of the tube means and alternately contracted and expanded by the reciprocal movement of the second rod means with respect to the tube means, guide sleeve means disposed within the tube means and disposed on the opposite side of the top means, said helical spring means and sleeve means operably upon the reciprocation of the second rod within the tube means for actuation of the latching means between an engaged and disengaged position with respect to the eccentric means.

* * * * *